United States Patent [19]

Sinharoy et al.

[11] Patent Number: 4,658,504

[45] Date of Patent: Apr. 21, 1987

[54] METHOD FOR INSULATING CONDUCTOR JOINTS PARTICULARLY BUS BARS AND INSULATED BUS BAR APPARATUS

[75] Inventors: Semahat D. Sinharoy, Monroeville Boro; Norman Davies, Penn Township Westmoreland County, both of Pa.

[73] Assignee: Westinghouse Electric Corp., Pittsburgh, Pa.

[21] Appl. No.: 768,773

[22] Filed: Aug. 23, 1985

[51] Int. Cl.⁴ .............................................. H01R 43/00
[52] U.S. Cl. ................................ 29/873; 174/DIG. 8; 339/275 B
[58] Field of Search ................. 29/873, 869, 871, 872; 174/DIG. 8; 339/DIG. 1, 116 R, 275 B; 156/344

[56] References Cited

U.S. PATENT DOCUMENTS

| | | | |
|---|---|---|---|
| 3,455,336 | 7/1969 | Ellis | 174/DIG. 8 X |
| 3,925,596 | 12/1975 | Siben | 339/275 B X |
| 3,982,564 | 9/1976 | Clabburn et al. | 174/DIG. 8 X |
| 4,060,887 | 12/1977 | Groef | 339/275 B X |
| 4,233,731 | 11/1980 | Clabburn et al. | 339/275 B X |
| 4,366,201 | 12/1982 | Changani et al. | 174/DIG. 8 X |
| 4,390,745 | 6/1983 | Böttcher et al. | 174/DIG. 8 X |

FOREIGN PATENT DOCUMENTS

1514924 6/1978 United Kingdom ......... 174/DIG. 8

Primary Examiner—Howard N. Goldberg
Assistant Examiner—Carl J. Arbes
Attorney, Agent, or Firm—L. P. Johns

[57] ABSTRACT

An electrical boot for the bus bar joints of electrical metal-clad switchgear is taught. The boot is formed by taking a piece of heat shrinkable material, disposing it over a joint or similar construction, heating and shrinking the material so that it shrinks to the shape of the joint or construction in question while at the same time, providing on two opened edges thereof a clamped chill bar which does not allow those portions to cohere to each other so that the boot may be removed after the formation process and easily disposed upon a bus bar joint located within the tight confines of a metal-clad switchgear cabinet. The process may be utilized to form metal-clad switchgear having bus bars with a heat-shrunk insulating boot on the joints thereof. Furthermore during the production process, a bolt envelope simulating template or jig may be utilized to fill out the area on the finalized boot which roughly corresponds to the outer dimensions of the bolt and nut arrangement.

7 Claims, 29 Drawing Figures

PRIOR ART

METHOD FOR INSULATING CONDUCTOR JOINTS PARTICULARLY BUS BARS AND INSULATED BUS BAR APPARATUS

BACKGROUND OF THE INVENTION

The subject matter of this invention relates generally to electrical insulating techniques and apparatus and electrically insulated apparatus and more particularly to techniques and apparatus for removably insulating bolted bus bar joints in metal clad or metal enclosed switchgear.

FIELD OF THE INVENTION

Electrical metal clad and metal enclosed switch-gear are known in the art. These apparatus usually include circuit control apparatus such as circuit breakers, switch-boards and the like contained and operated within a zero electrical ground potential metal cabinet for safety. Often, electrical bus bars interconnect terminals on internal portions of the apparatus with each other or with the electrical power line or in some cases, the electrical load served by the switchgear. There is usually a need to electrically insulate the bus bars from each other, from the electrical ground plane metal cladding and from personnel. According to the prior art, this may be done by wrapping the bus bars with insulating tape which in some cases may be of the heat shrinkable variety. In other instances, a fluidized coating process is utilized in which epoxy powder is disposed upon portions of the bus bar prior to assembly then heated and solidified. In the fluidized coating process, for example, the body of the bus bar is heated and the epoxy powder is disposed upon the heated bus bar whereupon it melts or liquifies then uniformly distributes itself over the bus bar before solidification. However, the region of a bus bar joint is usually kept bare until after assembly. Bus bars are often joined during the assembly process for the metal clad or metal enclosed switchgear. Usually the bus bar joints have three forms: lateral overlap, "T" or "L" or combinations thereof. Usually, the bus bar joints are bolted rather than welded for subsequent easy removal, replacement, repair or the like. After the bolting operation has taken place, the bare joint is often wrapped with heat shrinkable tape which is then heat shrunk to form a secure high quuality electrical insulation mass at the region of the joint. A product which is used for wrapping bus bars is sold under the name RAYCHEM HVBT heat shrinkable, non-tracking insulating tape. The terms "RAYCHEM" and "HVBT" are trademarks of the Raychem Corporation. Alternately, the joint may be covered with a shaped molded mass of insulating material, with emphasis on the word "molded". The molded mass of insulating material is pre-constructed using an injection or similar molding process and appropriate molding apparatus. Once molded, the molded insulating material may then be installed on the bus bar and fastened thereto in an appropriate manner. If one is interested in a relatively low cost reusable insulating mass for bus bar joints where it is desirable or required to periodically remove the insulating material and disassemble the bus bar joints, each of the above-indicated insulating techniques has problems associated therewith. With regard to the heat shrunk wrapped material, it is virtually unusable once removed because the shrinking and shape distortion has already taken place. Reinsulation usually requires starting anew with a fresh piece of heat-shrinkable material. Furthermore, the wrapping process during assembly is generally more difficult because of the space needed to move a section of wrapping material around a joint. Usually space in metal enclosed switchgear is cramped or confined. The bus bars tend to be relatively close together and accessibility to the joints thereof is severely limited. The molding process on the other hand lends itself to easier assembly but is relatively expensive because each kind of bus bar joints must be represented by a separate relatively expensive mold. Bus bar joints can vary not only in the shape thereof but also in the number of bus bars interconnecting at any one time and the relatively sizes of the bus bars in the joint. It is not unusual, for example, for some bus bar joints to have two interconnecting bus bars while other bus bar joints have three interconnecting bus bars. Furthermore, standard bus bars may have 6 inch or 4 inch widths and $\frac{1}{4}$ inch or $\frac{1}{2}$ inch thicknesses, respectively. Furthermore, combinations of 6 inch and 4 inch bus bars may be interconnected. One can see, therefore, that the number of possible bus bar connection possibilities is relatively large, yet in the molded insulation alternative each connection type usually requires a separate mold for forming the insulating mass that is to be used at that joint the molded insulating alternative therefore tends to be relatively expensive.

It would be advantageous, therefore, if an insulating process and apparatus could be found which could be used to easily insulate a wide variety of bus bar joints in assembled metal clad switchgear, which was relatively inexpensive and easily removed and replaced, but which nevertheless provided a completed bus bar insulation joint of high electrical quality.

SUMMARY OF THE INVENTION

In accordance with the invention, method and apparatus for removably electrically insulating an electrical conductor such as a bus bar are taught. The method includes the steps of covering the conductor with heat shrinkable electrical insulating material, abutting two portions of the inner surface of the electrical insulating material to each other, altering the thermal bonding capability of the two abutting portions to prevent cohesion thereof during the influence of the application of heat. Applying heat to the heat shrinkable insulating material to shrink it to form a mass of electrical insulation on the conductor which approximates the shape of the conductor and removably securing the non-cohered portions together for subsequent removal of the entire mass of electrical insulation from the conductor. The apparatus includes metal clad switchgear which has as a part thereof a bus bar joint which is covered by a mass of heat shrinkable electrical insulating material which is characterized as having abutting portions of the inner surface of the material secured to each other. The heat-shrunk mass of material has the general shape of the conductor upon which it is disposed. Furthermore, apparatus is taught for use in the above method for assisting in causing the mass of electrical insulation to more conveniently approach the shape of the electrical conductor upon which it is disposed, specifically in the region of the nut and bolt heads which secure joined conductors.

BRIEF DESCRIPTION OF THE DRAWINGS

For a better understanding of the invention, reference may be had to the preferred embodiment thereof shown in the accompanying drawings in which.

DESCRIPTION OF THE PREFERRED EMBODIMENT

Figure 1:
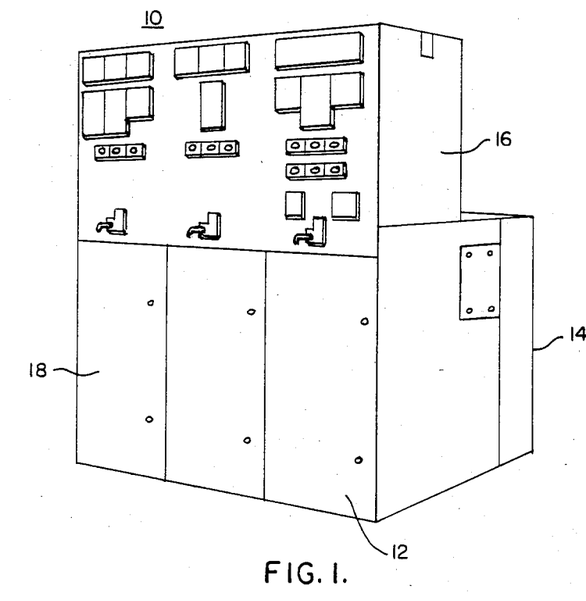
FIG. 1 shows an orthogonal view of metal clad switchgear which utilizes the teachings of the present invention.

Referring now to the drawings and FIG. 1 in particular, a switchgear assembly 10 which may utilize the teachings of the present invention is shown. Switchgear assembly 10 may comprise metal enclosed or metal clad electrical apparatus which may have a metal-enclosing front surface 12, rear surface 14 and side surfaces 16. In addition, the bottom and top of the assembly 10 may be made of metal material. A removble front panel 18 may be provided for allowing switchgear apparatus to be removably moved into and out of the switchgear assembly 10.

Figure 2:
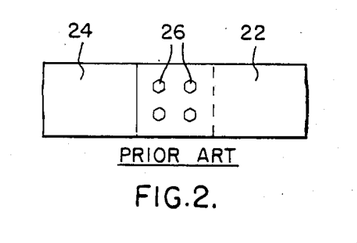
FIG. 2 shows a prior art plan view of a four-bolt lapped joint for two broken away sections of bus bar.
Figure 3:
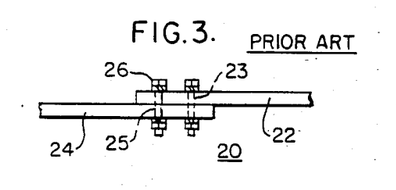
FIG. 3 shows an elevation of the joint of FIG. 2.

Referring now to FIGS. 2 and 3, a prior art electrical bus bar lap joint or connection is shown. In the assembly shown in FIGS. 2 and 3, there is provided a first bus bar 22 on the right which is overlapped with a second bus bar 24 on the left for providing a relatively secure electrically conductive joint therebetween. The structural and electrical integrity of the bus bar joint represented by the assembly 20 is highly enhanced by aligning complementary holes 23 and 25 in bus bars 22 and 24, respectively, and then utilizing a non-limiting number of nut and bolt assemblies 26 to draw the oppositely disposed, adjacent, planar, electrically conductive surfaces of bus bars 22 and 24 into a secure electrically conductive disposition. In a preferred embodiment of the present invention, it is desired to electrically insulate the overlapping region of the prior art bus bars 22 and 24 and the bolt assemblies 26 associated therewith to provide a new interconnecting arrangement.

Figure 4:
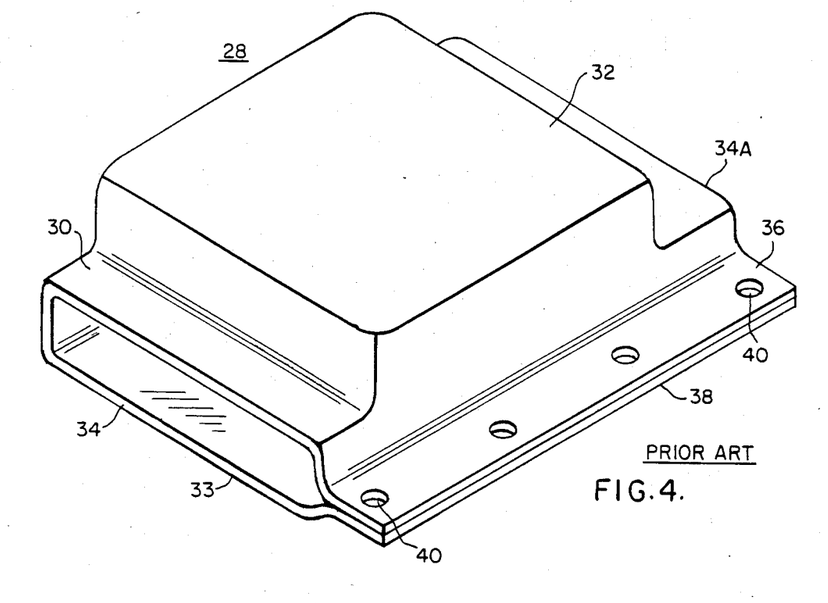
FIG. 4 shows a prior art molded insulator for the lap joint of FIGS. 2 and 3.

Referring to FIG. 4, a prior art arrangement for accomplishing the aforementioned is shown. There is provided an insulating molding 28 which includes a main body 30, an upper protrusion 32, a lower protrusion 33, a lateral side edge 34 defining an opened end for the molding 28 and a similar opening (not shown) identified by an oppositely disposed lateral edge 34A. There is provided a top lip 36 which is aligned with a bottom lip 38. Holes 40 are either molded into the lips 36 and 38 during the molding process or disposed therein afterwards. The prior art molding 28 is relatively flexible and formed by an injection molding process in which the relative shape of the lips, the open ends, the protrusions, and the sides of the main body are formed in a mold into which liquid molding material is injected for subsequent solidification. A different mold is provided for every shape of molding 28 desired.

Figure 5:
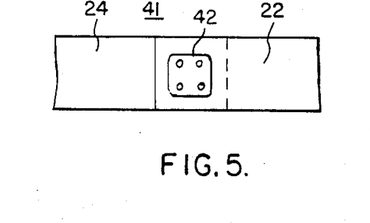
FIG. 5 shows a lapped bus bar joint similar to that shown in FIGS. 2 and 3 in plan view with a forming jig.
Figure 6:
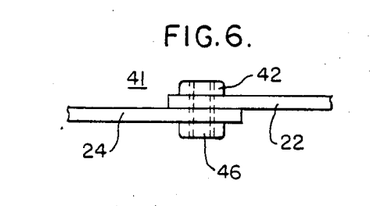
FIG. 6 shows an elevation of the apparatus of FIG. 5.

Referring now to FIG. 5 and FIG. 6, a template bus bar arrangement 41 is shown. Bus bar arrangement 41 may be made by overlapping bus bar 22 and 24 which may be the same as bus bars 22 and 24 of FIG. 2 or alternately sectional representations thereof for use only in the process for making the insulating mass of the present invention. Typically, bus bars 22 and 24 of prior art FIGS. 2 and 3, for example, may be aluminum or copper depending upon the electrical use required. In the process for providing insulation for an assembly such as 20 of FIGS. 2 and 3, aluminum bus bar sections 22 and 24 are utilized in the template arrangement of FIGS. 5 and 6. The aluminum sections have the advantage of not readily removing heat from the region of the joint and thus more efficiently aiding in the forming process. Bolt and nut region templates or jigs 42 and 46, are provided for the assembly 41 to provide a simulation of the outer dimensions and spacing of the bolt heads and nut heads of the arrangements 26 shown in FIG. 3, for example. The bus bars 22 and 24 and the top and bottom bolt simulating templates or jigs, 42 and 46, respectively, are secured together in a convenient fashion such as by the utilization of countersunk holes and complementary threaded screws for example, in a manner to be described hereinafter with respect to FIGS. 7 through 16, for example.

Figure 7:
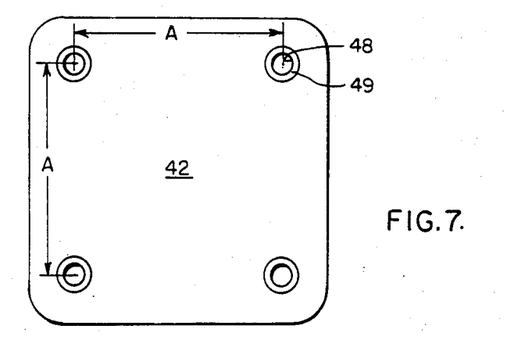
FIG. 7 shows a plan view of one jig portion of FIG. 6 in greater detail.
Figure 8:
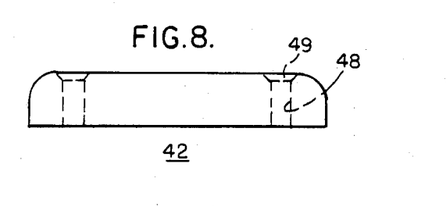
FIG. 8 shows an elevation of the jig portion of FIG. 7.
Figure 9:
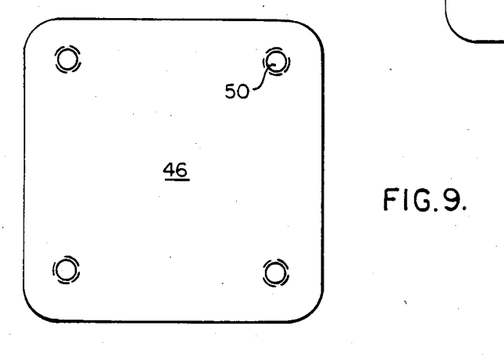
FIG. 9 shows a plan view of the complementary jig portion of FIG. 6 in greater detail.
Figure 10:
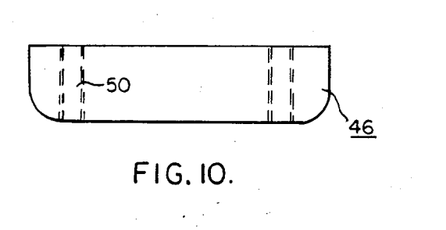
FIG. 10 shows an elevation of the jig portion of FIG. 9.

Referring now to FIGS. 7 through 10, upper and lower bolt simulating jig arrangements such as are shown particularly in FIGS. 5 and 6 are depicted in greater detail. In the arrangements which follow the terms "upper" and "top" or "lower" and "bottom" are used for convenience of illustration and are not limiting. FIGS. 7 and 8 show a top bolt simulating jig portion 42 for four equally spaced bolts having bolt-hole sacing or separation A. Holes or openings 48 are disposed through the template portion 42. The top portion of each bolt hole may be countersunk at 49 so that the tops of the fastening bolts may be flush with the upper surface of the template 42 to enhance the insulation forming process. The bottom nut simulating template or jig portion 46 has complementary threaded holes 50 therein so that fasteners or bolts which are inserted into holes 48 are attached in a threaded manner to the bottom template or jig 46 after capturing bus bars (not shown) therebetween.

Figure 11:
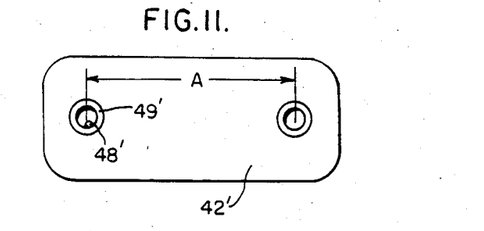
FIG. 11 shows a plan view of a two bolt jig portion.
Figure 12:
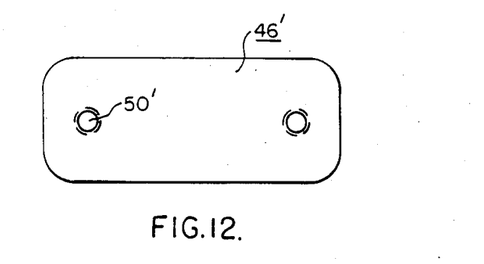
FIG. 12 shows a plan view of the complementary portion for FIG. 11.
Figure 13:
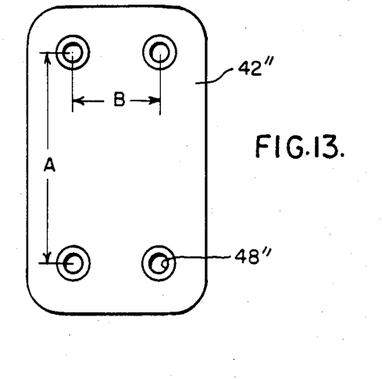
FIG. 13 shows a plan view of another four bolt jig portion, similar to the one shown in FIG. 6.
Figure 14:
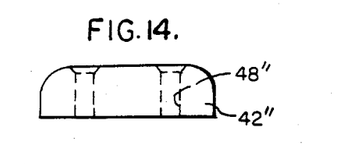
FIG. 14 shows an elevation of the jig portion of FIG. 13.
Figure 15:
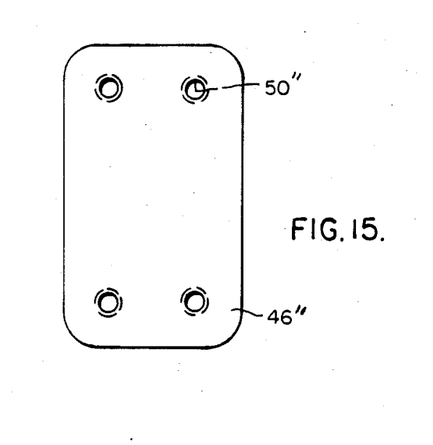
FIG. 15 shows a plan view of a complementary jig portion for the jig portion of FIG. 13.
Figure 16:
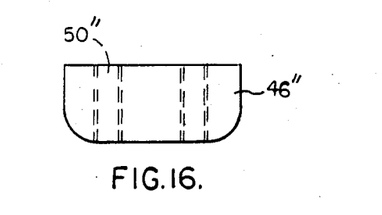
FIG. 16 shows an elevation of the jig portion of FIG. 15.

Referring now to FIGS. 11 and 12, a template arrangement for a two hole bolt spacing arrangement is shown. Upper template portion 42' has two spaced holes 48' which may be countersunk at 49' and which may have the same separation, i.e. A as holes 48 in FIGS. 7 and 8. Likewise, bottom template portion 46' may have threaded holes 50' similar to that shown with respect to bottom portion 46 of FIGS. 9 and 10.

Referring to FIGS. 13 through 16, four hole upper and lower bolt and nut simulating templates or jig arrangements 42" and 46" are shown. In this case, the holes or openings 48" and 50" are not equispaced as with jigs 42 and 46. Rather, the dimensions A and B are unequal. Reference again to FIG. 7, for example, will show that dimensions A are utilized all the way around between bolt centers.

The three upper and lower unit and bolt simulating jig arrangements shown in FIGS. 7 through 16 are exemplary and not limiting. Other arrangements may be provided.

It is to be understood that the principal of the present invention does not require the utilization of the bolt envelope simulating templates or jigs. The formation of the insulating covering may be done over a bolt and nut assembly such as 26 shown in FIGS. 2 and 3, for example. This is in fact done in another embodiment of the present invention. The arrangement shown in FIGS. 5 and 6 in which the smooth, rounded-corner, nut and bolt simulating envelope jigs are utilized is more preferable in some applications. This is because of the reduced likelihood of the formation of insulation weaknesses during the formation proces which weakness may be associated with the sharp edges and corners of the nut and bolt assembly 26.

Figure 17:
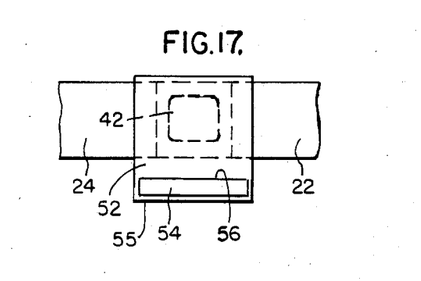
FIG. 17 shows an elevation of apparatus utilized to perform the process of the present invention before the process has been completed.
Figure 18:
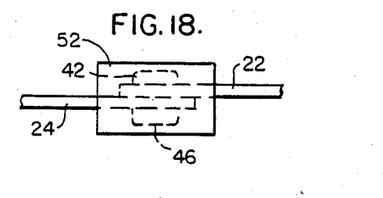
FIG. 18 shows a plan view for the arrangement of FIG. 17.

Referring now to FIGS. 17 through 20, the process and apparatus associated with the present invention is described in greater detail. In FIG. 17, the overlapping electrical bus bar simulator or conductor members 22 and 24—which may or may not be the actual electrical conductors upon which the finished product is utilized—are shown. The upper and lower template or jig assemblies 42 and 46 are shown fastened in place on the electrical bus bar simulators or conductors 22 and 24. Heat shrinkable material is cut or otherwise formed into a sheet 52 which may be folded over the entire fastened assembly including the members 42, 22, 24 and 46. Copper chill plates 54 may be inserted over the upper and lower abutting adjacent lip or edge portions 55 of the folded over material. This may provide two functions. First, the plate 54 may act as a chilling member to remove heat away from the material 52 in the local region 56 of plate 54 so that shrinkage does not take place thereat. Second, plate 54 may also provide a firm base for clamping the edge portions of sheet 52 together so that a well-formed insulating product may be formed.

Figure 19:
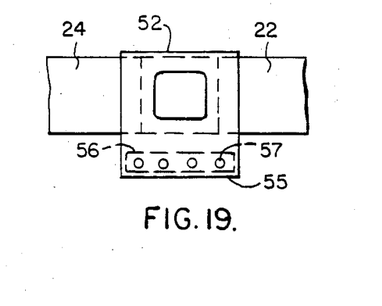
FIG. 19 shows an elevation of the apparatus of FIG. 17 after the process has been completed.
Figure 20:
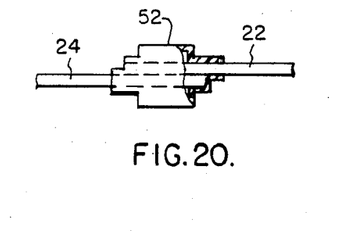
FIG. 20 shows a plan view of the apparatus of FIG. 19.

In FIGS. 19 and 20, heat had been applied in the region of the sheet 52 so that it shrunk and approximates or adopts the dimensions and shapes of the material over which it is disposed thus forming a relatively tight electrical insulating product which may then be removed from the bus bar arrangements or joined simulators 22 and 24 and then placed on the actual bus bar arrangement in a finished switchgear cabinet. Region 56 did not shrink in relation with the remainder of the sheet 52 nor because of the presence of the chilling bar 54 did the material at the edges of sheet 52 in regions 56 cohere. It is this lack of cohesion which allows the finished, shaped material 52 to be removed from the bus bar and template assembly represented by members 22, 24, 42 and 46 to be subsequently placed on a finished bolted bus bar assembly within the tight confines of a metal clad or metal enclosed switchgear cabinet. Furthermore, by utilizing holes or openings 57, the non-cohesed lip portions may be mechanically fastened together to enhance the electrical quality of the covering 52 at the completed joint within the switchgear cabinet.

In FIGS. 21 through 25, more detailed arrangements of various kinds of insulated bus bar assemblies are shown. It is to be understood that these views are non-limiting and that other combinations or arrangements of the insulating material on interconnected bus bar members are possible.

Figure 21:
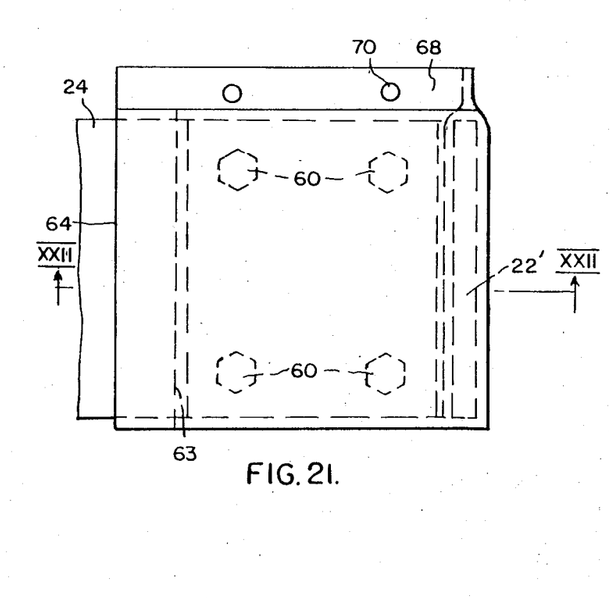
FIG. 21 shows a cut-away insulated lap joint arrangement similar to that shown in FIG. 2 but with a right angle bend.
Figure 22:
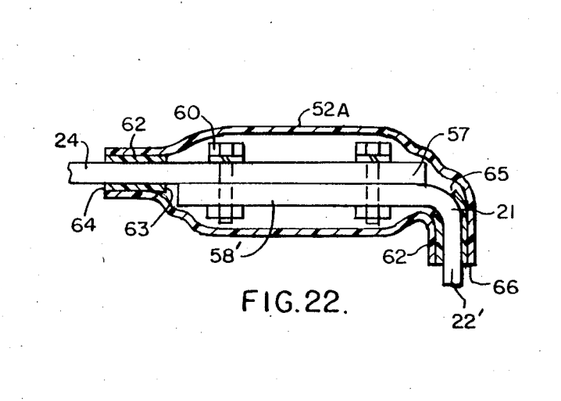
FIG. 22 shows a cut-away view of the insulated lap joint of FIG. 21 through Section XXII—XXII.

In FIGS. 21 and 22, a lap joint similar to the lap joint shown in FIGS. 2 and 3, for example, is shown in completed form. There is provided a first bus bar 24 and a second bus bar 22' which is interconnected with bus bar 24 in an overlapping flat surface to flat surface arrangement and secured thereto by way of nut and bolt assemblies 60 in a manner described previously. Bus bar 22' has an incidental right angle bend therein at 21. The bus bars 24 and 22' have disposed thereon electrical insulation material 62, for example. The electrical insulation material 62 is non-limiting but in a preferred embodiment of the invention may be the kind which is formulated in the fluidized coating process described previously. The insulating material 62 has end portions or edges 63 and 65, on conductors 24 and 22', respectively. It is desirous that the electrical insulating material 52A overlap the insulating material 62 in the regions of the aforementioned edges 63 and 65. For this purpose, the material 52A, for example, in FIG. 22 is cut such that its lateral edges 64 and 66, for conductor 62 and 22', respectively, overlap the edges 63 and 65, respectively. The conductors 22' and 24 have bare regions and 57 where the electrical conductivity therebetween is established. Region 68 is that part of the insulating material which is clamped and chilled during the fabricating process so that the edge portions thereof do not cohere nor do they shrink.

Figure 23:
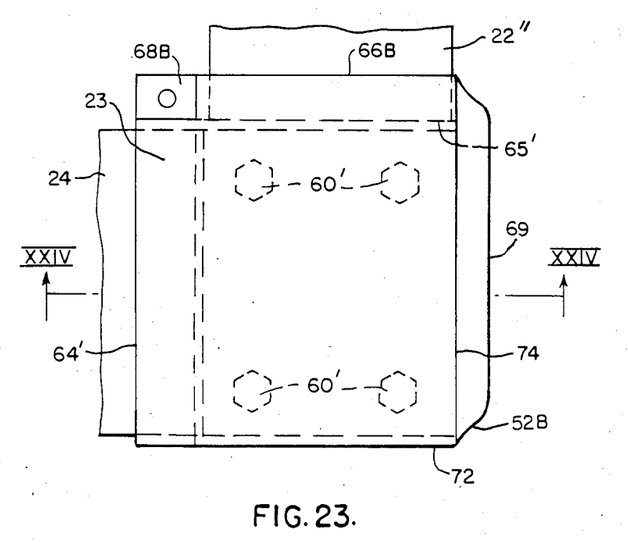
FIG. 23 shows a plan view of a cut-away insulated "L" joint arrangement.
Figure 24:
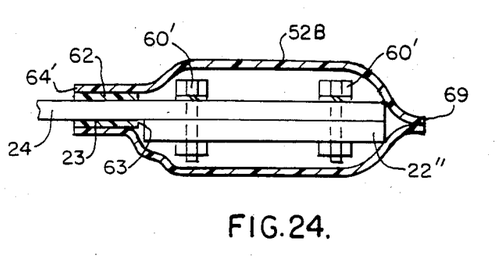
FIG. 24 shows a cut-away elevation of the arrangement of FIG. 23 through Section XXIV—XXIV.

Referring now to FIGS. 23 and 24, a right angle or "L" lap joint assembly is depicted. In this case, a conductor 24 is interconnected at right angles with an electrical conductor 22". The ends or edges of the bus bar insulation 63 and 65' respectively, are overlapped by the insulation edges 64' and 66B, respectively, of the insulating boot or sleeve 52B. In this case, the nut and bolt assemblies 60', for instance, are covered by the insulating member boot or sleeve 52B by folding two edges of a piece of heat shrinkable material at the fold 72 leaving an opening in the region of the edge 64' and an opening in the region of the edge 66B. The portion 68B is cold clamped as described previously to prevent it from cohering while the portion 69 is not cold clamped so that when the heat shrinking process takes place, the temperature of the region 69 is raised to a sufficient value to cause those portions which overlap to cohere to one another. When the insulating material 52B is inserted upon the L-shaped bus bar during the final assembly, one or more fastening members such as but not limited to plastic nuts and bolts may be joined in the region 68B to securely retain the insulating member 52B on the L-shaped joint.

Figure 25:
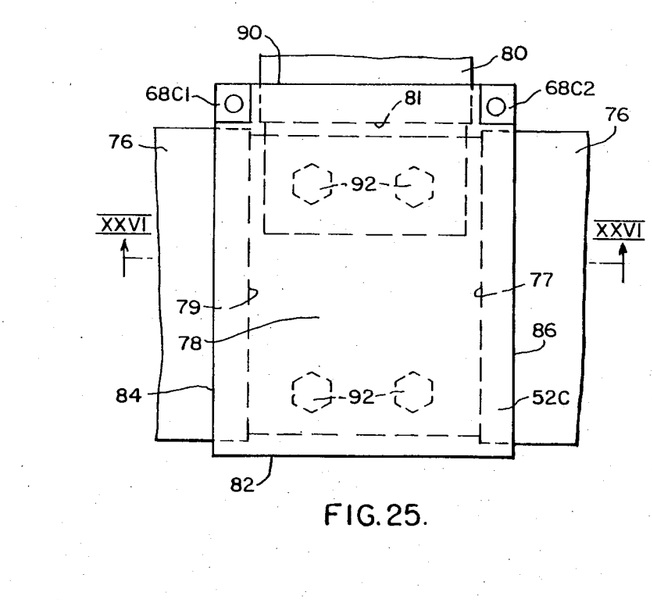
FIG. 25 shows a plan view of a cut-away insulated "T" joint arrangement.
Figure 26:
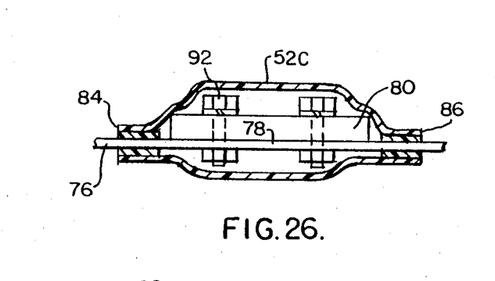
FIG. 26 shows a cut-away elevation of the apparatus of FIG. 25 through Section XXVI—XXVI.

Referring now to FIGS. 25 and 26, a "T" joint is formed from the intersection of a bus bar member 76 and a perpendicularly disposed bus bar member 80. Bus bar member 76 has a portion 78 thereof which is retained as bare. Member 80 is perpendicularly disposed thereupon and aligned by way of bolts and nut assemblies 92 therewith. Edges 84, 86 and 90 of boot or insulating member 52C overlap bus-bar insulation edges 77, 79 and 81 of the conductive members so that a complete integral well-insulated joint is formed in the process. A piece of heat shrinkable material 52C is folded over at 82 across the bare joint which includes the nut and bolt arrangements 92 or in the forming process which may include template arrangements 42' and 46' for example, as shown in FIGS. 11 and 12. The heat shrinkable insulating material 52C is overlapped on an inner surface to inner surface arrangement in the regions of 68C1 and 68C2 and cold clamped so that the inner surfaces of the edges thereof will not cohere. The entire insulating mass 52C is then heat shrunk to adopt to the shape of the joint.

Figure 27:
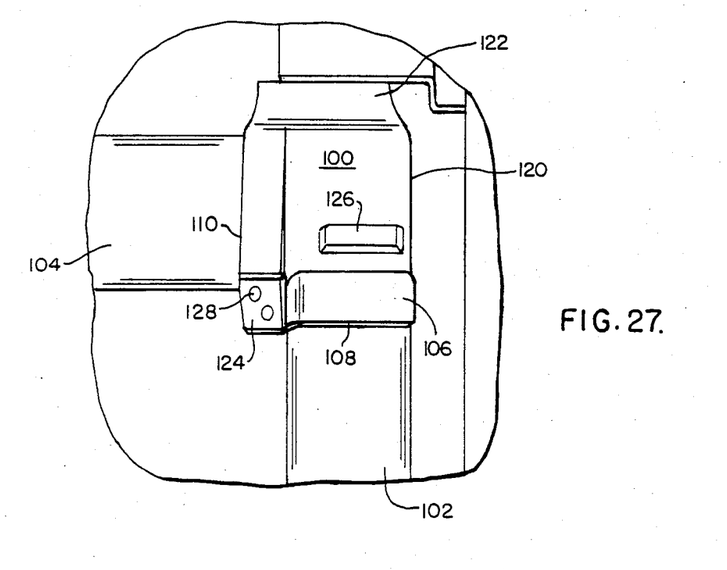
FIG. 27 shows a three-dimensional view of an "L" joint bus bar arrangement installed in a switchgear cabinet.

Referring now to FIG. 27, an orthogonal view of an L-shaped joint similar to, but not exactly the same as that shown with respect to FIGS. 23 and 24 is depicted. In this case, insulated bus bars 102 and 104 are overlapped in an L-shaped configuration and heat shrunk insulation 106 is disposed thereon in insulating arrangement. The edges 108 and 110 of the insulation 106 overlap the edges (not shown) of insulation on the bus bars 102 and 104. The combination of the bus bar and boot 106 forms an assembly 100. The boot 106 in this case is formed by folding the insulating material at the region 120 and sealing the opening at 122 by exposing that normally opened region to the full heat and temperature of the heat shrinking process. The protrusion 126 in this case indicates a two bolt molding process such as the kind which may use the template or jig members or portions shown and described with respect to FIGS. 11 and 12. The region 124 is cold clamped during the heating process to prevent the abutting adjacent inner surfaces of the insulation 106 thereof from cohering during the heating process. Fastener members 128 are provided in holes or openings disposed in the boot 106 to complete the fastening process on bus bars 104 and 102.

Figure 28:
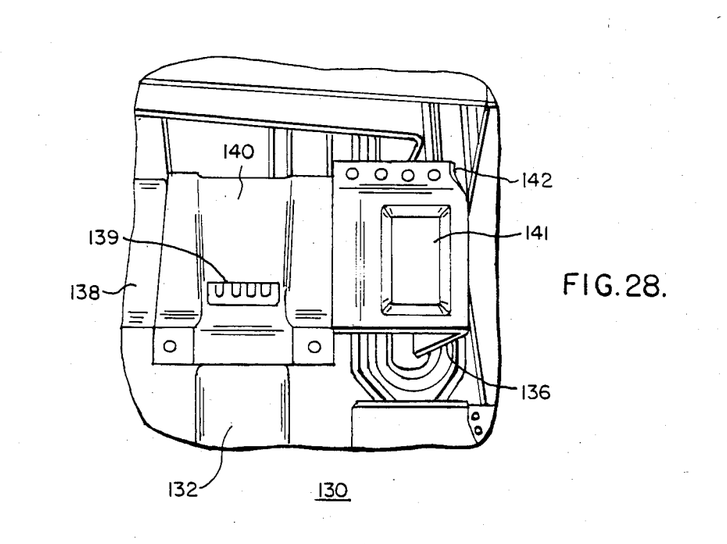
FIG. 28 shows a three-dimensional view of a lap joint arrangement and a "T" joint arrangement in a switchgear cabinet.

Referring now to FIG. 28, a more complicated bus bar arrangement is shown. In this case, there is shown an assembly 130 in which a bus bar 132 is interconnected with bus bar 138 in a manner similar to that shown with respect to FIGS. 25 and 26. Furthermore, the right portion of the bus bar 138 is interconnected with a perpendicularly disposed bus bar 136 similar to that arrangement shown with respect to FIGS. 21 and 22. The region around the interconnection of the bus bar 132 with the bus bar 138 is covered by an insulating mass 140 which has open ends onto the bus bars 138 and onto the bus bar 132. Note that a two nut and bolt assembly template or jig arrangement such as that shown with respect to FIGS. 11 and 12 is utilized to form the boot 140 initially and is related to the protrusion 139. This as is obvious from the profile of the boot 140 is then placed over the two fastener arrangement for interconnecting the bus bar 132 with the bus bar 138. In regard to insulating material 142, it is to be noted that a four bolt arrangement similar to that shown with respect to the templates or jigs depicted in FIGS. 7 through 10 or FIGS. 13 through 16 is utilized for the formation of the insulation 142 and this is related to the protrusion 141.

Figure 29:
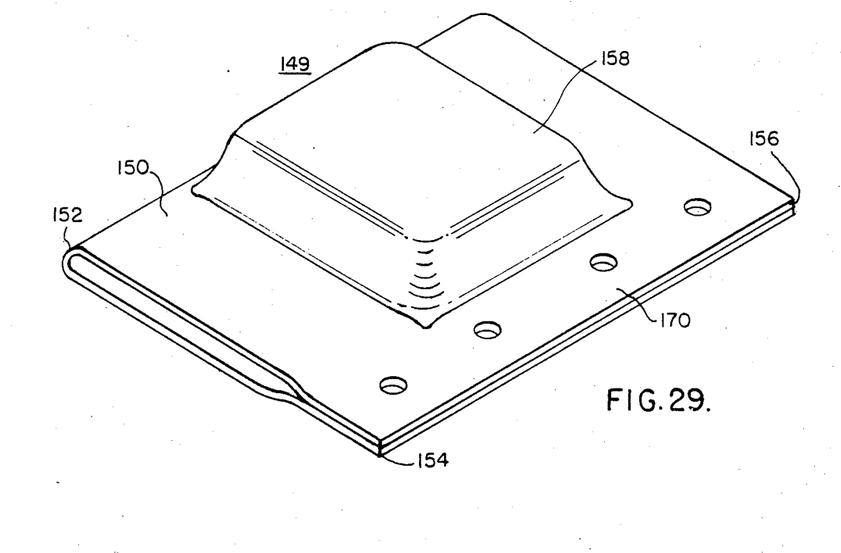
FIG. 29 shows an orthogonal view of a piece of insulating material produced according to the process of the present invention.

Referring to FIG. 29, a depiction of a finished boot arrangement embodying teachings of the present invention is shown. The boot arrangement 149 is exemplary and not limiting except in the way it is made and in the particular interrelationship with corresponding bus bars. To form it, a piece of heat shrinkable material 150 is folded over itself at a fold 152 and disposed upon a bus bar jig or similar arrangement (not shown). In this case a four bolt template is disposed on top and bottom (not shown) for the formation of the protrusion 158 on the top. Of particular importances, edges 156 and 154 of the heat shrinkable material are overlapped with each other in an inner surface to inner surface relationship to distinguish from the typical prior art wrapping processes in which an inner surface to outer surface relationship is utilized. The material 150 is heated on a template arrangement (not shown) in a preferred embodiment of the invention to a temperature of approximately 120° F. to 130° F. to cause the shrinking process to take place. The heat shrinkable material 150 typically is the kind described previously and identified by the aforementioned trademark. Typically, the heat shrinkable material is cut off of rolls which may be 34 to 35 inches in width and cut into the appropriate pieces for folding over the joint or forming arrangement as the case may be and for completing the heat shrinking process.

With respect to the region shown at 69 in FIG. 23, for example. This sealed portion is formed after the initial heat sinking process by joining the inner surfaces of the abutting portions thereof and heating that material to a temperature of approximately 30° F. to 40° F. hotter than was required during the normal heat shrinking process. This causes the inner surfaces of the material to cohere to each other thus forming the sealed seam 69, for example, in FIG. 23.

The flat lip portion 170 of FIG. 29 remains in a non-sealed or cohered disposition because of the utilization of a cold clamp (not shown) during the heat shrinking process which removed sufficient heat from the region 170 to prevent the members 154 and 156 from cohering to form a sealed joint. This allows the completed insulating boot 149 to be removed from the template.

It is to be understood, that the apparatus taught with respect to the embodiments of this invention is not limited to use on bus bars but may be used to insulate interconnections of any kind on an electrical conductor. Furthermore, it is also to be understood that the process and the apparatus taught with respect thereto is not limited to joint insulation. It is also to be understood that the process may be utilized on a completely assembled conductor such as a bus bar with the bolts in place without the necessity of removing it for further disposition on another bus bar assembly.

The apparatus taught with respect to the embodiments of this invention has many advantages. One advantage lies in the fact that bus bar joints for electrical metal-clad switchgear may be relatively inexpensively formulated for repeated removal and reuse and for insulating bus bar joints in the confined spaces of electrical metal-clad or metal enclosed switchgear without necessitating the use of an expensive molded covering.

What we claim as our invention is:

1. A method for removably electrically insulating an electrical conductor, comprising the steps of:
   surrounding a portion of the conductor with a flat sheet of heat shrinkable electrically insulating material;
   abutting any two portions of the inner surface of the electrically insulating material to each other which will cause said portion of said conductor to be enclosed by said flat sheet;
   altering the thermal bonding capability of the two abutting portions to prevent cohesion thereof under the influence of the application of heat;
   applying heat to the heat shrinkable insulating material to shrink the non-abutted portion of said flat sheet to form a mass of electrical insulation on said conductor which is generally the shape of said conductor;
   removably securing the non-cohered portions together for subsequent removal of the entire mass of electrical insulation from said conductor; and
   altering the thermal bonding capability of the two abutting portions comprising using a heat sink in the area of the two abutting portions to direct heat away from said two abutting portions.

2. The method as claimed in claim 1 wherein said heat sink comprises a clamp for clamping the two inner portions together at the outer surfaces thereof.

3. A method for electrically insulating an electrical conductor, comprising the steps of:
   surrounding a template device which approximates the shape of said conductor with a flat sheet of heat shrinkable electrically insulating material;
   abutting any two portions of the inner surface of the electrically insulating material to each other which will cause said template device to be enclosed by said flat sheet;
   altering the thermal bonding capability of the two abutting portions to prevent cohesion thereof under the influence of the application of heat;
   applying heat to the heat shrinkable insulating material to shrink the non-abutted portion of said flat sheet to form a mass of electrical insulation on said template device which approaches the shape of said conductor;
   removing the mass of electrical insulation from said template device;
   securing said mass of electrical insulation on said conductor; and
   altering the thermal bonding capability of the two abutting portions comprising using a heat sink in the area of the two abutting portions to direct heat away from said two abutting portions.

4. The method as claimed in claim 3 wherein said heat sink comprises a clamp for clamping the two inner portions together at the outer surfaces thereof.

5. A method for insulating bus bar joints, comprising the steps of:
   constructing a model bus bar joint having the same general dimensions as the bus bar joint to be insulated;
   covering the model bus bar joint with a flat sheet of heat shrinkable electrically insulating material;
   abutting any two portions of the inner surface of the heat shrinkable electrically insulating material to each other to cause said model bus bar joint to be enclosed by said flat sheet;
   altering the thermal bonding capability of the two abutting portions to prevent cohesion thereof under the influence of the application of heat;
   applying heat to the heat shrinkable insulating material to shrink the non-abutted portion of said flat sheet to form a mass of electrical insulation on said model bus bar joint which approaches the shape of said model bus bar joint;
   removing the mass of electrical insulating material from said model bus bar joint by flexing said heat shrink material thus separating said non-cohered portions and relatively moving the model bus bar joint and the resulting separation in said mass of electrical insulating material away from each other;
   placing said mass of electrical insulating material on the bus bar joint to be insulated by separating said non-cohered portions and relatively moving said bus bar joint to be insulated and the resulting separation in said mass of electrical insulating material relative to each other to an enveloping disposition;
   securing said mass of electrical insulating material in an electrically insulating disposition on said bus bar joint to be insulated by abutting said two portions of said inner surfaces and securing them together; and
   altering the thermal bonding capability of the two abutting portions comprising using a heat sink in the area of the two abutting portions to direct heat away from said two abutting portions.

6. The method as claimed in claim 5 wherein said heat sink comprises a clamp for clamping the two inner portions together at the outer surfaces thereof.

7. The method as claimed in claim 5 comprising the additional step of placing complementary nut and bolt arrangement jigs on said model bus bar joint to simulate the dimensional envelope thereof.

* * * * *